United States Patent [19]

Klein

[11] Patent Number: 4,998,547
[45] Date of Patent: Mar. 12, 1991

[54] VEHICLE WASHER COMMUNICATION SYSTEM

[75] Inventor: Julian L. Klein, Apopka, Fla.

[73] Assignee: Ryko Manufacturing Company, Grimes, Iowa

[21] Appl. No.: 401,975

[22] Filed: Aug. 31, 1989

[51] Int. Cl.$^5$ .............................................. B60S 3/04
[52] U.S. Cl. ............................ 134/57 R; 15/DIG. 2; 134/123
[58] Field of Search .................. 134/57 R, 58 R, 123; 15/DIG. 2

[56] References Cited

FOREIGN PATENT DOCUMENTS

| | | | |
|---|---|---|---|
| 0145550 | 8/1983 | Japan | 15/DIG. 2 |
| 0227543 | 12/1984 | Japan | 15/DIG. 2 |
| 0050057 | 3/1985 | Japan | 15/DIG. 2 |
| 0060054 | 4/1985 | Japan | 15/DIG. 2 |
| 0247951 | 10/1987 | Japan | 15/DIG. 2 |

Primary Examiner—Philip R. Coe
Attorney, Agent, or Firm—Allegretti & Witcoff, Ltd.

[57] ABSTRACT

A vehicle washer includes vehicle washing apparatus including multiple washing operations or mechanisms. The washer also includes a power source, message transmitter such as an electronic digital voice recorder, an input mechanism such as a coin box or keypad, and an activation circuit. The message transmitter is provided with an audio or other message to be played for a vehicle operator while adjacent the coinbox or keypad, from a speaker. The input mechanism accepts multiple manual inputs and responsively provides multiple input signals including multiple washing mechanism activation signals and a recorder activation signal. The activation mechanism is interconnected to the input means, the power source, the washing mechanisms and the recorder means for receiving the multiple washing mechanism activation signals, and responsively interconnecting the power source and the washing mechanisms, and responsively interconnecting the power source and the recorder. The interconnection of the power source and washing mechanism is interconnection of one or more of the washing mechanisms dependent on which of the washing mechanism activation signals is provided, and the interconnection of the transmitter is dependent on receipt of at least one of the washing mechanism activation signals.

1 Claim, 2 Drawing Sheets

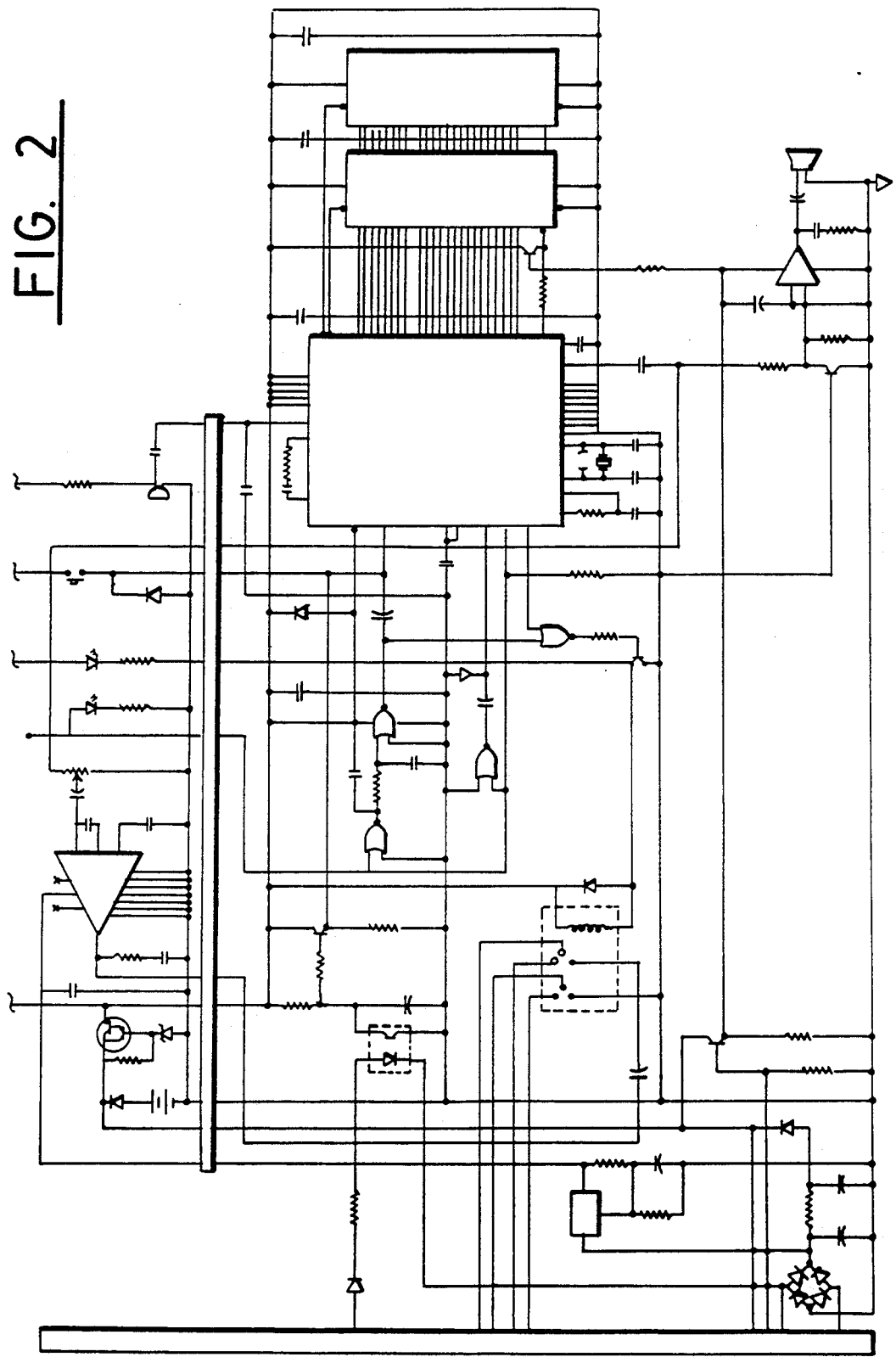

4,998,547

VEHICLE WASHER COMMUNICATION SYSTEM

BACKGROUND OF THE INVENTION

This invention relates generally to an automatic vehicle washer.

Typically, an automatic vehicle washing device includes several washing operations or mechanisms, including a basic washing cycle, an enhanced washing cycle, wax application equipment and the like. The automatic vehicle washing device allows a driver of a vehicle to select from available options by varying a deposit of coins or tokens in a coin box, or varying an entry of codes on a keypad. After selection is made and the vehicle positioned in a predetermined location, the washing equipment activates and cleans the vehicle as selected.

The invention relates more particularly to automatic vehicle washing devices as described.

SUMMARY OF THE INVENTION

In a principal aspect, the invention constitutes a vehicle washer comprising, in combination, several components: vehicle washing apparatus having multiple washing operations (by definition, including at least cleanup operations and possibly also not only cleaning but waxing and other non-water and non-cleaning operations), an electrical power source, a message transmitter such as an electronic digital voice message transmitter an input mechanism such as a coin box or keypad, and an activation mechanism. The voice message transmitter includes only a playback unit, or it is provided with a message "recorder adapted to have recorded and re-recorded a message"; to be transmitted to a vehicle operator while adjacent the coinbox or keypad. The input mechanism accepts multiple manual inputs and responsively provides multiple input signals including multiple washing operation activation signals and a transmitter activation signal. The activation mechanism is interconnected to the input means, the power source, the washing apparatus and the transmitter means for receiving the multiple washing operation activation signals, and responsively interconnecting the power source and the washing apparatus, and responsively interconnecting the power source and the transmitter means. The interconnection of the power source and washing apparatus is interconnection to provide one or more of the washing operations dependent on which of the washing operation activation signals is provided, and the interconnection of the transmitter means is dependent on receipt of at least one of the washing operation activation signals.

The message transmitter includes, preferably, a digital electronic voice recorder and playback circuit, upon which a voice message may be imposed, and readily changed, as desired through a microphone. Such a message is imposed at the will of the principals of the automatic vehicle washer, such as the washer manager. As most preferred, the imposed message provides to vehicle drivers, through a speaker, information concerning non-selected washing operations available to the drivers.

BRIEF DESCRIPTION OF THE DRAWING

A preferred embodiment of the present invention herein with reference to the drawing wherein:

FIG. 2 is a schematic diagram of the audio circuit of the preferred embodiment shown in FIG. 1.

DETAILED DESCRIPTION OF THE PREFERRED EMBODIMENT

Figure 1:
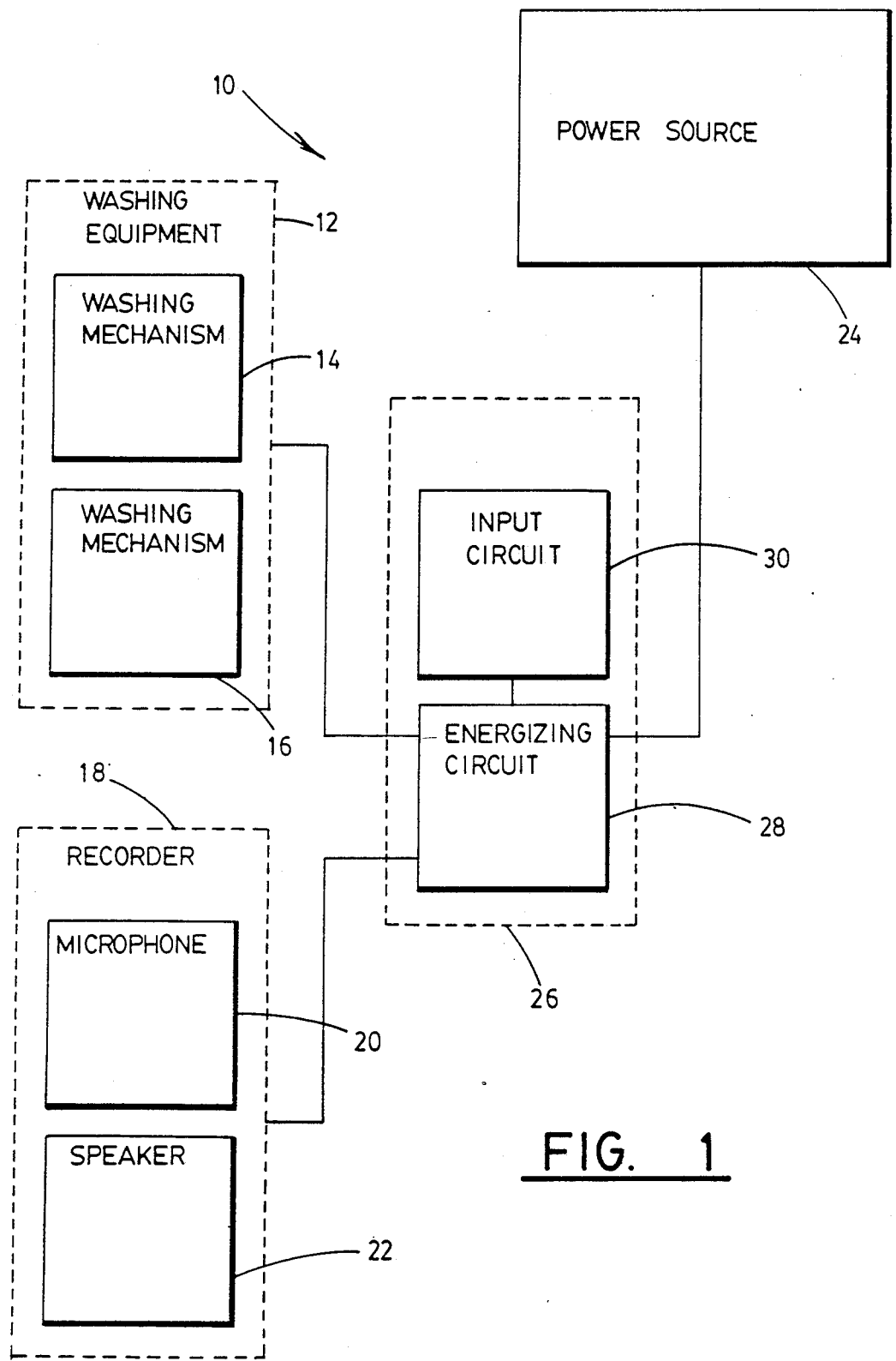
FIG. 1 is a simplified block diagram of a preferred embodiment of the present invention.

Referring to FIGS. 1 and 2, a preferred embodiment of the present invention is shown as an automatic vehicle washer, generally designated 10. As shown most clearly in FIG. 1, the automatic vehicle washer 10 includes vehicle washing equipment 12 having multiple washing mechanisms 14 and 16, a recorder device and circuit 18 including a microphone 20 and a speaker 22, an electrical power source 24 for the vehicle washing equipment 12 and recorder 18, and an activation circuit 26.

The activation circuit 26 is interconnected between the washing equipment 12, the recorder 18, and the power source 24, and includes at least an energizing circuit 28 and an input circuit 30. A more complex activation circuit is possible; one such circuit adaptable to use is shown in Re. 32,601 reissued Feb. 16, 1988 on an Automatic Vehicle Washer to Julian L. Klein et al., incorporated by reference as a whole.

The input circuit 30 includes an input device for a driver of a vehicle (not shown) to manually input coins or tokens, or manually transmit numerical input to the vehicle washer 10. If numerical, the input device permits of multiple numerical inputs. If a coin box, the device permits of multiple coin amounts or multiple tokens, per activation sequence, vehicle and wash. While a variety of input devices could be used, the present invention is illustrated as using a coin box.

After receiving a manual input of "a numerical input, a numerical input accompanied with manual input of coins or tokens, or"; coins or tokens, the input circuit 30 responsively transmits input signals to the energizing circuit 28. The input signals vary, dependent on the manual input at the input device. For example, an insertion of coins sufficient to pay a pre-set amount for a basic vehicle wash cycle results in a "basic wash" input signal. An insertion of coins sufficient to pay for an enhanced or luxury wash cycle results in a "luxury wash" signal. Upon receiving an input signal, the energizing circuit 28 interconnects the power source 24 to an input acknowledgement device of the input circuit, such as a lighted display panel, and awaits a further input from the manual input. The further input may include additional coins or tokens, for additional selections of washing mechanisms, and may eventually include a "power on" signal from a specific "power on" button or similar input device.

Simultaneously with interconnection of the power source 24 and input acknowledgement device, the energizing circuit 28 interconnects the power source 24 to the recorder 18. The recorder 18 is activated for all run signals, or only pre-set run signals, as preferred. For example, the recorder 18 may be activated only when the "basic wash" signal is received, or activated whenever a wash cycle enhancement is available and not selected manually, or activated for all run signals. The recorder includes, preferably, a digital electronic voice recorder and playback circuit, upon which a voice message may be imposed, and readily changed, as desired through the microphone 20. Such a message is imposed and changed at the will of the principals of the washer 10, such as the washer manager, not vehicle drivers. As most preferred, the imposed message provides to vehicle drivers information concerning one or more non-selected wash cycle enhancements available to the drivers.

The preferred audio system of the washer 10 is schematically diagrammed in FIG. 2.

The invention and the preferred embodiment of the present invention are now described in such full, clear, concise and exact terms as to enable persons of ordinary skill in the art to make and use the invention. A variety of alterations from the preferred embodiment as illustrately and shown are possible, without departing from the scope of the invention. As an example, the circuity of FIG. 2 may possibly be substantially altered. Thus, as evident from the lack of textual description of the circuitry, the circuitry is but one possible form of satisfactory circuitry. Further, the physical embodiment of the invention may be original equipment or may be the result of modification and enhancement to existing washers having existing washer apparatus, power sources, input devices, and activation circuits. To particularly point and distinctly claim the subject matter regarded as invention, the following claims conclude this specification.

What is claimed is:

1. A vehicle washer comprising, in combination:
    a vehicle washing apparatus providing multiple washing operations;
    an electrical power source;
    manual input means for enabling a vehicle driver to select multiple manual inputs corresponding to the multiple washing operations;
    a message transmitter means including a voice message recorder and a playback device adapted for communicating a message to the vehicle driver, the message notifying the vehicle driver of the availability of unselected multiple washing operations and further permitting the vehicle driver to select previously unselected multiple operations before any of the multiple washing operations begin on the vehicle of the vehicle driver;
    input means for receiving multiple manual inputs at different times and responsively providing, after a first set of multiple manual inputs, multiple input signals including a message transmitter activation signal, and further responsively providing, after a second set of multiple manual inputs, multiple input signals including multiple washing operation activation signals, said multiple washing operation activation signals being provided responsively from both said first set of multiple manual inputs and said second set of multiple manual inputs; and
    activation means, interconnected to the input means, the power source, the washing apparatus and the message transmitter means, for receiving the multiple washing operation activation signals, and responsively interconnecting the power source and the washing apparatus, the interconnection being to provide one or more of the washing operations dependent on which of the washing operation activation signals is provided, the activation means further for interconnecting the power source and the message transmitter means, the interconnection of the message transmitter means being dependent on receipt of at least one of the washing operation activation signals.

* * * * *